W. S. PHELPS.
Wrist Pin Turner.
No. 38,060. Patented March 31, 1863.
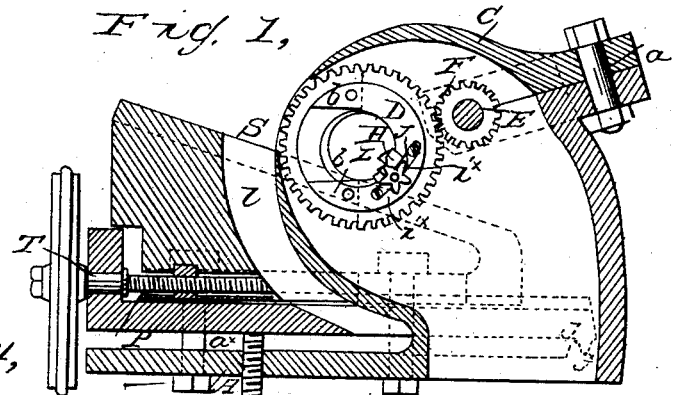
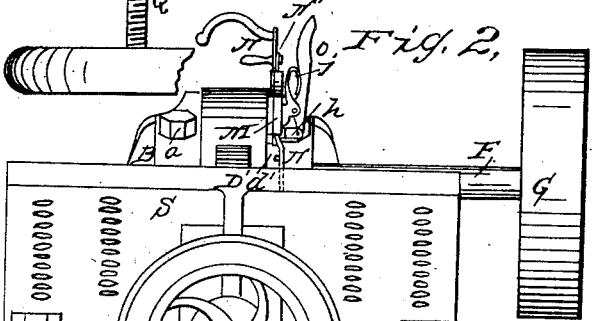
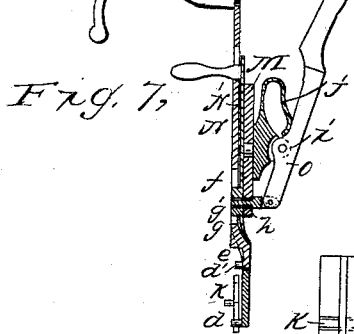
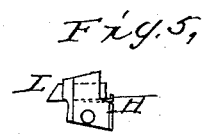
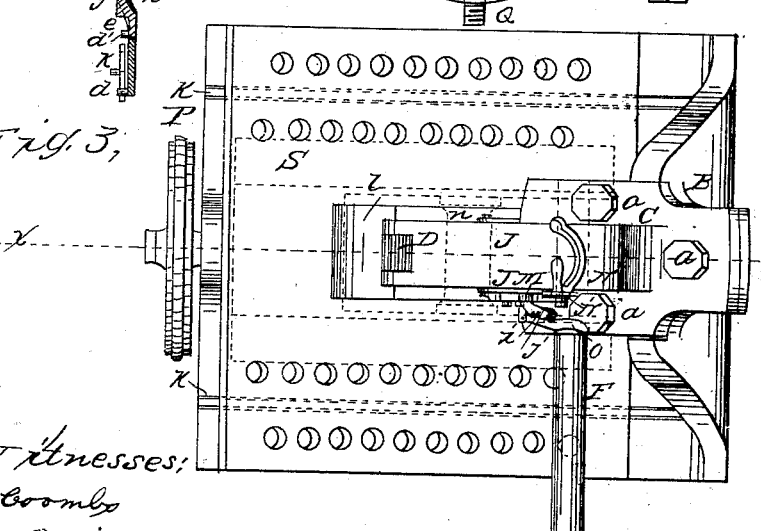
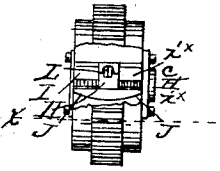
Witnesses:
J. W. Coombs
G. W. Reed
Inventor:
W. S. Phelps
per Munn & Co.
attorneys

UNITED STATES PATENT OFFICE.

WALTER S. PHELPS, OF DETROIT, MICHIGAN.

IMPROVEMENT IN TURNING CROSS-HEAD WRISTS OR PINS, &c.

Specification forming part of Letters Patent No. 38,060, dated March 31, 1863.

*To all whom it may concern:*

Be it known that I, WALTER S. PHELPS, of Detroit, in the county of Wayne and State of Michigan, have invented a new and useful Device for Turning Cross-Head Wrists or Pins, or for turning any cylindrical part of machinery which is secured between two arms; and I do hereby declare that the following is a full, clear, and exact description of the same, reference being had to the accompanying drawings, making a part of this specification, in which—

Figure 1 is a side sectional view of my invention, taken in the line $x\ x$, Fig. 3; Fig. 2, a back view of the same; Fig. 3, a plan or top view of the same; Figs. 4, 5, 6, and 7, detached views of parts pertaining to the same.

Similar letters of reference indicate corresponding parts.

This invention relates to a new and useful implement or device for turning the wrists or pins of cross-heads, and for turning any other cylindrical part of machinery which is secured to or formed between arms connected at one end by a permanent cross-bar, which prevents the cylindrical part being rotated by entire revolutions in a lathe, and consequently precludes said part being turned with facility. The usual mode employed for turning such cylindrical parts of machinery is to center them in a lathe and allow them to turn one-half a revolution, which is all the distance they can turn, on account of the cross-bar, and then reverse the movement of the article, so that it may turn and then make another half-revolution, the cutting-tool acting upon half of the part to be turned. The article is then reversed in the lathe and the other half turned. This is a slow and tedious operation, which is avoided by my invention, the latter consisting in the employment or use of a geared rotating ring having a cutter affixed to it and used in connection with an adjustable bed-plate, all arranged as hereinafter fully shown and described.

To enable those skilled in the art to fully understand and construct my invention, I will proceed to describe it.

A represents a horizontal plate, which has an upright curved T-shaped projection, B, at one end of it, on which a cap, C, is placed and secured by bolts $a$. In this projection B there is made a semicircular recess, and a similar-shaped recess is made in the cap C, the two recesses, when the cap C is secured on the projection B, forming a circular opening, in which a ring, D, is fitted, said ring having a rabbet at each side of it, into which flanges $a'$ on the cap and projection B fit and retain the ring in proper position. (See Fig. 4.) The ring D is toothed at its periphery, and has a pinion, E, gearing into it, said pinion being on a shaft, F, which has a driving-pulley, G, upon it. The ring D is made in two parts connected together by rivets, bolts, or screws $b$, arranged in any proper way, so that the two parts may be disconnected to admit of the ring being fitted on the part to be turned, and said ring has a groove or recess, $c$, made transversely in its inner side to receive a nut, H. This groove or recess $c$ is of dovetail form in its transverse section, so as to hold the nut and at the same time admit of the latter sliding in it.

I, Fig. 6, is a screw on which the nut H is fitted. This screw is fitted at its ends in plates J J, which are secured one at each side of the ring D, and on one end of said screw there is fitted a tappet-wheel, K, which is shown clearly in Fig. 1.

In the nut H the cutting-tool L is fitted, as shown in Fig. 5.

To one side of the cap C there is secured a socket, M, which has two slides, N N', fitted in it, one slide being in contact with the other, and both provided at their lower ends with pins $d\ d'$. The slide N is longer than the slide N', and the pin $d'$ of the former projects through a slot, $e$, in the latter, and the slide N has a cleat or guide, $f$, at its inner side, which also fits in the slot $e$ of slide N. Both slides are perforated with two holes, $g\ g'$, to receive a pin, $h$, at the lower end of a lever, O, the fulcrum-pin $i$ of which is connected to the socket M, and the lever O has a spring, $j$, acting against it, which spring has a tendency to keep the pin $h$ in the holes $g$ or $g'$. Both of the slides N N' are adjustable, and by means of the pin $h$ and holes $g\ g'$ the pins $d\ d'$ may be so placed or adjusted relatively with the tappet-wheel K that the arms $i'^\times$ thereof may come in contact with either of them, as desired. The pin $d$ is below the tappet-wheel K, and the pin $d'$ above it, and consequently the wheel K and screw I may be turned in either direction, as desired. The screw I moves the nut H, and consequently the cutter or tool L, giving the latter its feed motion at every revolution of the ring D. The slides may also be adjusted so that both pins $d\ d'$ may be adjusted free from the tappet-wheel K.

On the plate A there is placed a similar plate, P, having a cleat, $j$, at its front end and under side, said cleat fitting in a recess, $j'^\times$, in plate A. The plate P at its back part may be raised and lowered and secured at any desired angle by means of a screw, Q, which passes up through the plate A, as shown in Fig. 1. On the plate P there is placed a plate, R, which rests or is fitted upon two parallel ways or guides $k\ k$, on plate P. This plate R has an inclined plate, S, attached to it; or both plates R S may be cast in one piece, the latter having a recess or chamber, $l$, in it to receive a part of the projection B, in which the ring D is fitted, the sides of the recess or chamber $l$ serving as a support for the plate S. The plate R may be moved or adjusted forward or backward on the ways or guides $k\ k$ by means of a screw, T, the bearing $m$ of which is on the plate B. (See Fig. 1.)

The cross-head or other article to be operated upon is firmly secured on the plate S, and the cap C is detached from the projection B, and the two parts of the ring D separated, so that they may be fitted over the wrist $n$ of the cross-head. The wrist $n$ is then adjusted centrally within the ring D by inclining the plate P more or less through the medium of the screw Q, and by adjusting said plate farther forward or backward through the medium of the screw T. These plates are then secured in position by bolts $a^\times$. The cutter L is then adjusted in a proper working position, which may be done by means of a punch inserted in a hole, $o$, at either side of the ring. (See Fig. 4.) The cutter is placed at one end of the screw I, and the shaft F is rotated by any convenient power, and a rotary motion communicated to the ring D by means of the pinion E, gearing into the teeth on the periphery of the ring. The cutter L is thus made to act upon the wrist $n$ and cut or turn the same in cylindrical form, the tool being fed along at each revolution of the ring by means of the screw I, which is actuated or turned in consequence of the arms $i^\times$ of the tappet-wheel K coming in contact with the pin $d$ or $d'$ of the slide N or N′. By this means the cutter is fed along the wrist in either direction, according to which pin $d$ or $d'$ is set for the tappet-wheel K to act against, and the wrist will consequently be turned in cylindrical form.

Having thus described my invention, what I claim as new, and desire to secure by Letters Patent, is—

1. The ring D, provided with a cutter, L, arranged as shown, or in an equivalent way, to be operated or fed automatically by the rotation of the ring, for the purpose herein set forth.

2. Providing the ring D with teeth on its periphery, and fitting the same within a proper bearing formed by a stationary projection, B, and a cap, C, substantially as shown, for the purpose of operating or rotating the ring directly from the driving-shaft F, as herein set forth.

3. The inclined plate S, in combination with the plates P R, arranged as shown, in connection with the plate A and screws Q T, for the purpose of adjusting the work concentrically within the ring D, or in a proper relative position with the cutter L, as herein described.

4. The nut or cutter-stock H, in combination with the screw I, tappet-wheel K, adjustable slides N N′, provided with the pins $d\ d'$, and the catch or pin $h$ or its equivalent, for the purpose of feeding the cutter L to its work, as set forth.

WALTER S. PHELPS.

Witnesses:
J. C. GOODENOUGH,
J. H. CONNELLY.